(12) United States Patent
Brickell et al.

(10) Patent No.: US 7,073,195 B2
(45) Date of Patent: Jul. 4, 2006

(54) CONTROLLED ACCESS TO CREDENTIAL INFORMATION OF DELEGATORS IN DELEGATION RELATIONSHIPS

(75) Inventors: Ernie F. Brickell, Portland, OR (US);
Wesley Deklotz, Portland, OR (US);
Jeff U. Glover, Portland, OR (US);
Michael R. Premi, Portland, OR (US);
Matthew D. Wood, Hillsboro, OR (US); Marion H. Shimoda, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 918 days.

(21) Appl. No.: 10/055,923

(22) Filed: Jan. 28, 2002

(65) Prior Publication Data

US 2003/0145223 A1    Jul. 31, 2003

(51) Int. Cl.
*H04L 9/00* (2006.01)
*G06F 7/04* (2006.01)
*G06Q 99/00* (2006.01)

(52) U.S. Cl. .................. 726/5; 713/156; 713/175; 705/76

(58) Field of Classification Search .................. None
See application file for complete search history.

(56) References Cited

U.S. PATENT DOCUMENTS

| 5,903,882 | A | * | 5/1999 | Asay et al. ................ 705/44 |
| 6,108,788 | A | * | 8/2000 | Moses et al. .............. 713/155 |
| 6,718,470 | B1 | * | 4/2004 | Adams ....................... 726/10 |
| 2002/0083014 | A1 | * | 6/2002 | Brickell et al. ............. 705/76 |
| 2003/0084172 | A1 | * | 5/2003 | deJong et al. ............. 709/229 |
| 2003/0084288 | A1 | * | 5/2003 | de Jong et al. ............ 713/168 |

OTHER PUBLICATIONS

Housley et al, "Internet X.509 Public Key Infrastructure Certificate and CRL Profile", Jan. 1999, Network Working Group RFC 2459, p. 1-129.*

* cited by examiner

*Primary Examiner*—Christopher Revak
(74) *Attorney, Agent, or Firm*—Pillsbury Winthrop Shaw Pittman LLP

(57) ABSTRACT

An arrangement is provided for controlled access to identification and status information or delegated credentials. A delegation, formed between a delegator and a delegate, is registered with a delegate credential service provider. The delegate requests a service from a relying party that then requests, based on the requested service and the delegation, delegated credential from the delegate credential service provider. The delegate credential service provider sends the delegated credential to the relying party. According to the received delegated credential, the relying party generates a service response and sends the response to the delegate.

25 Claims, 12 Drawing Sheets

CONTROLLED ACCESS TO CREDENTIAL INFORMATION OF DELEGATORS IN DELEGATION RELATIONSHIPS

RESERVATION OF COPYRIGHT

This patent document contains information subject to copyright protection. The copyright owner has no objection to the facsimile reproduction by anyone of the patent document or the patent, as it appears in the U.S. Patent and Trademark Office files or records but otherwise reserves all copyright rights whatsoever.

BACKGROUND

Aspects of the present invention relate to data transmission. Other aspects of the present invention relate to authenticated data transmission.

In the age of electronic transactions, a party to a transaction often must reveal confidential or sensitive information to another party to the transaction. For instance, a user may have to furnish a service provider with information that proves that the user is qualified to receive the service or has the resources to pay for the service. The service provider may be termed a relying party; the service provider relies on the furnished information to justify doing business with the user. For example, a provider of services to physicians may need to verify that a user has a valid medical license in some state, to acquire the user's Drug Enforcement Administration (DEA) license number, or to verify that no sanctions have been imposed on the DEA license. Typically, a user may not want such information to become public.

A digital certificate is an electronic "identity card" that establishes a user's credentials when the user participates in a transaction on the World Wide Web (WWW). Such a digital certificate may be issued by a certification authority (CA), complying with known standards, such as the X.509 PUBLIC KEY INFRASTRUCTURE (PKI) FOR THE INTERNET, see, e.g., RFC 2459. A digital certificate may be stored in a publicly accessible registry. The user's digital certificate has a public key of the user in the certificate, and the user keeps the corresponding private key secret. When needed, a relying party, for authentication purposes, can access the credential information contained in the user's certificate.

FIG. 1 (prior art) illustrates an exemplary architecture for digital certificate based authentication. A user 110 provides credential information 115 to a certification authority 120 that subsequently generates a digital certificate 125 for the user 110. The digital certificate 125 may be registered in a public registry 130. When the user 110 signs a service request with his private key and sends the service request 135 to a relying party 140, the relying party 140 accesses the public registry 130 to obtain the digital certificate 125 corresponding to the user 110. Based on the credential information contained in the digital certificate 125 and the validity of the signature provided by the user 110, the relying party 140 generates a service response 145 and sends it to the user 110. According to the credential information contained in the digital certificate 125, the relying party 140 may either grant or deny the service request 135.

In FIG. 1, because the digital certificate is publicly accessible, the user's credential information becomes public as well. For users who wish to shield certain information from the public, certificate 100 is not a safe means to convey such information. In addition, the relying party 140 cannot be certain that the information contained in the digital certificate 125 is up to date or even valid. For instance, some of the information contained in a digital certificate may change over time. Yet, all information in the digital certificate 125 is static. In order to modify even one item of information therein, the certification authority 120 must revoke the digital certificate 125 and issue an entirely new certificate.

A different scenario relates to delegated credential in a delegation relationship. When a party (e.g., delegator) delegates certain authority to another party (e.g. delegate), the delegate may use the delegated authority to request authorized services. For example, a physician may delegate an office administrator to obtain information, from a relying party, about the usage of certain drugs. To obtain the desired information from the relying party, the administrator may need to, first, show that he or she has the delegated authority to make the inquiry and, second, provide the relying party with necessary credential information of the physician. At the same time, the delegator may require the flexibility to change the terms of a delegation when such need arises.

BRIEF DESCRIPTION OF THE DRAWINGS

The present invention is further described in terms of exemplary embodiments, which will be described in detail with reference to the drawings. These embodiments are non-limiting exemplary embodiments, in which like reference numerals represent similar parts throughout the several views of the drawings, and wherein.

DETAILED DESCRIPTION

The processing described below may be performed by a properly programmed general-purpose computer alone or in connection with a special purpose computer. Such processing may be performed by a single platform or by a distributed processing platform. In addition, such processing and functionality can be implemented in the form of special purpose hardware or in the form of software being run by a general-purpose computer. Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

Figure 1:
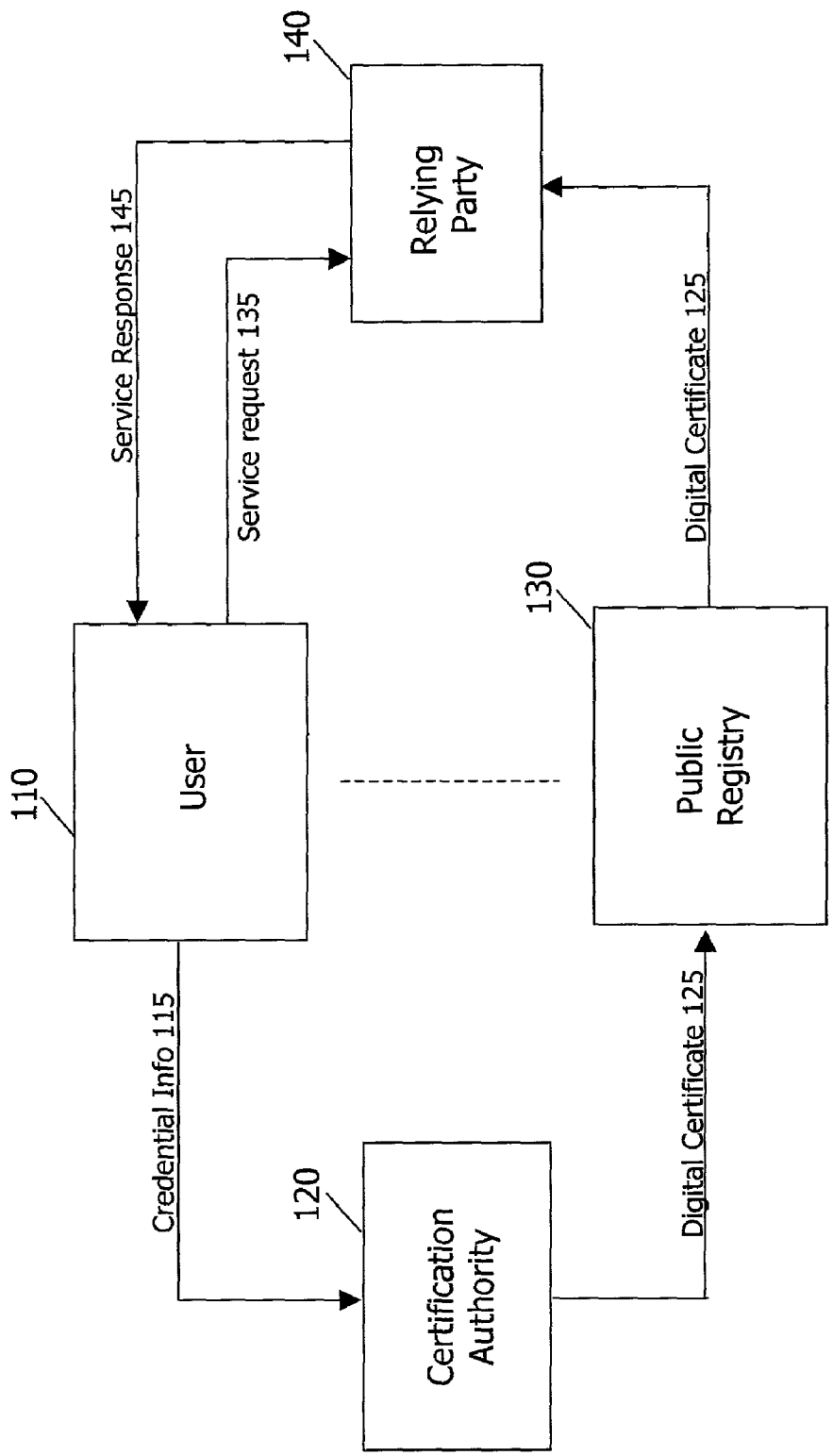
FIG. 1 (prior art) illustrates an exemplary architecture for digital certificate based service offerings.
Figure 2:
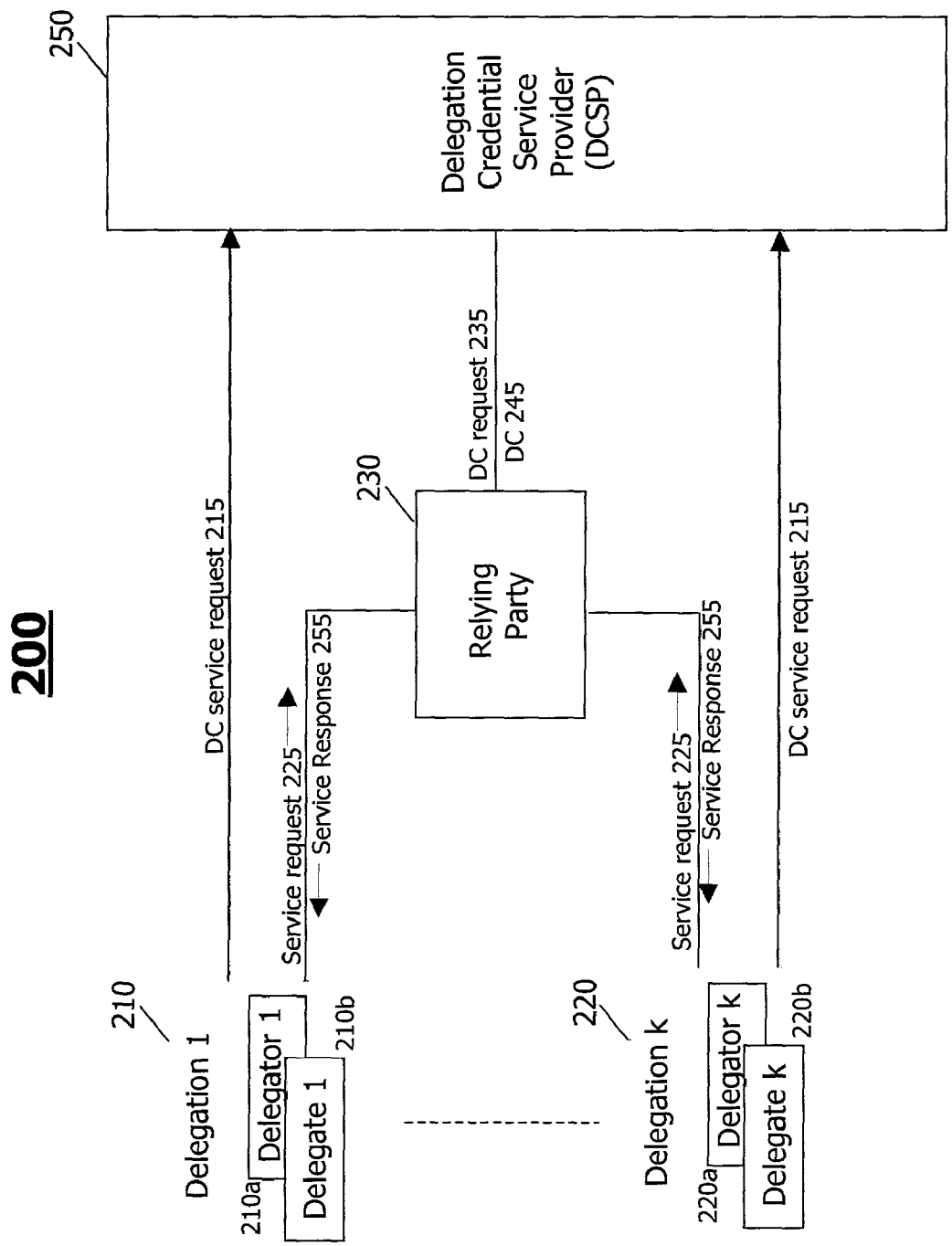
FIG. 2 depicts a high level architecture of a system, in which a relying party authorizes services according to delegated credential managed by a delegation credential service provider, according to embodiments of the present invention.

FIG. 2 depicts a high level architecture of a framework 100, in which a relying party 230 authorizes services to a plurality of delegates 210b, . . . , 220b based on delegate credential (DC) information obtained from a delegation credential service provider (DCSP) 250, according to embodiments of the present invention. In FIG. 2, a delegate in general is a user who is assigned a delegation. In FIG. 2, without the loss of generality, we refer to a user who is engaged in a delegation relationship as either a delegator who assigns a delegation authority or a delegate who is assigned a delegation authority. For example, delegate 1 210b is assigned delegation 1 210 with delegated authority from delegator 1 210a and delegate k 220b is assigned delegation k 220 with delegated authority from delegator k 220a. Not every user is necessarily engaged in a delegation. For presentation purposes, we discuss only those users who are currently engaged in some delegation relationship. Alternatively, we may also treat all users under some delegation relationships, some of which may represent a null delegation engaging users who are currently not in effective delegations. The following description on all aspects of the present invention assumes a user to be under a delegation.

A user (e.g., 210b) having certain delegated authority and registered at the DCSP 250 with appropriate credential information of both the delegator and the delegate, may send a service request 225 to the relying party 230 for a particular service. To authenticate the user 210b, the relying party 230 sends a CI request 235 to the DCSP 250 to obtain credential information (CI) 245 that is necessary for authentication purposes. According to the registered delegation and credential information, the DCSP 250 sends back the requested CI 245 to the relying party 230. Based on the received CI 245, the relying party 230 returns a service response 255 to the user 210b. The service response 255 may contain the information requested by the user if the authentication is successful. The service response 255 may also correspond to a rejection of service if the delegate credential does not satisfy the authentication requirement.

A delegation relationship between a delegator and a delegate is registered with the DCSP 250. A delegator may give certain authority to its delegate. For example, a physician may delegate an office administrator the authority of inquiring drug information. The physician could authorize this delegation by signing a message indicating this delegation with his private key. To register a delegation relationship with the DCSP 250, both the authority and the signed message are communicated to the DCSP 250.

To register a delegation, the delegator and the delegate may connect to the DCSP 250. Such a connection may be made through a communication device that is capable of interacting with the DCSP 250. For example, such a communication device may be a personal computer, a hand held device such as a Palm Pilot™, or a cellular phone. The communication with the DCSP 250 may be across a generic network such as a local area network (LAN), a wide area network (WAN), the Internet, a wireless network, or a proprietary network.

Registering a delegation relationship with the DCSP 250 may require both the delegator and the delegate to provide related information to the DCSP 250. Such information may include their credentials or any other types of information. In our description, we generically refer such combination of different types of information as credential information. Credential information could include medical license numbers. Credential information could also include the current status of a medical license, which could be obtained from a licensing board. The credential information may contain information that should be released only upon certain conditions. Possible conditions on the release of a particular piece of credential information include: release only to specified relying parties, release only if there is a request to release signed by the user, release only if there is a request to release signed by a delegate of the user. Other possible conditions also exist. The DCSP will always check that the conditions for release are met before releasing a piece of credential information.

Depending on the service requested from the relying party 230 and the associated authentication requirement, appropriate credential information may be used to authenticate a user for requested service. For example, if the credentials of a delegate alone is adequate for authentication purposes, only such credential information may be retrieved and sent to the relying party 230 for authentication. If the credential from the delegate is not adequate, appropriate delegator credential (the credential of the delegator) information may be retrieved and used in authentication. When a user who is currently not under an effective delegation (or engaged in a null delegation) requests a service from the relying party, the relying party 230 in this case may request from the DCSP 250 only the credential information of the user. That is, the delegated credential 245 may, in general, refer to appropriately determined credential information.

To facilitate delegation credential service, the DCSP 250 may provide both digital credential service and delegation service. Such services may be subscribed separately or jointly. For example, a user may simply subscribe digital credential service, which provides centralized management of the user's digital credential information. By subscribing the digital credential service, a user may receive a digital certificate (discussed in reference to FIG. 4), which certifies the user's digital credential service registration with the DCSP 250. A user who is a subscriber of the digital credential service of the DCSP 250 may also subsequently subscribe, when such need arises, the delegation service offered by the DCSP 250. For example, the user may need to delegate someone or may be delegated by someone of certain authority. In this case, the user may supply the DCSP 250 with information with respect to the delegation such as the information about the other party of the delegation as well as the terms of the delegation. Similarly, by subscribing the delegation service, a user may receive a delegation certificate (discussed in reference to FIG. 4), which certifies the user's delegation service registration with the DCSP 250.

The relying party 230 may correspond to a service provider that offers services to authorized users. For example, it may be a medical information service provider that supplies various kinds of medicine related information to medical professionals who have valid medical license. In this case, for each service request received, the relying party 230 authorizes the requested service only when the user who requests the service holds, directly or indirectly (e.g., through a delegation) a currently valid medical license (credential).

For each service request, the relying party 230 may determine the credential requirements needed for the service and then accordingly request the needed credential information from the DCSP 250. If a user who requests a service does not have adequate credential, required credential may be provided based on an available delegation. This may be achieved in various methods according to different embodiments of the present invention. For instance, a delegate (e.g., delegate 210b) may, when sending a service request to the relying party 230, indicate an appropriate delegation. The specified delegation may describe the delegation in terms of its delegator and the delegation terms (e.g., what authorization is released to the delegate). Upon receiving the delegation with the service request, the relying party 230 may then determine whether to use the delegator credential (the credential of the delegator) to authorize the service.

If a user does not indicate a delegation in a service request, the relying party 230 may inquire, on its own initiative, whether there is an adequate delegate credential from an appropriate delegation authorized to the user. It may request the user to submit a particular delegation. It may also send a request to the DCSP 250 to inquiry whether there is a delegation under the user's identification. When a delegation is identified, the relying party 230 may further send a request for related credential information and authenticate the service based on that. Yet another alternative approach to identify an appropriate delegation for adequate credential is for the DCSP 250 to identify a relevant delegation and return the delegated credential and credential information associated with the relevant delegation to the relying party 230. The DCSP 250 will verify that the conditions for release of a piece of credential information are met before releasing credential information.

Figure 3:
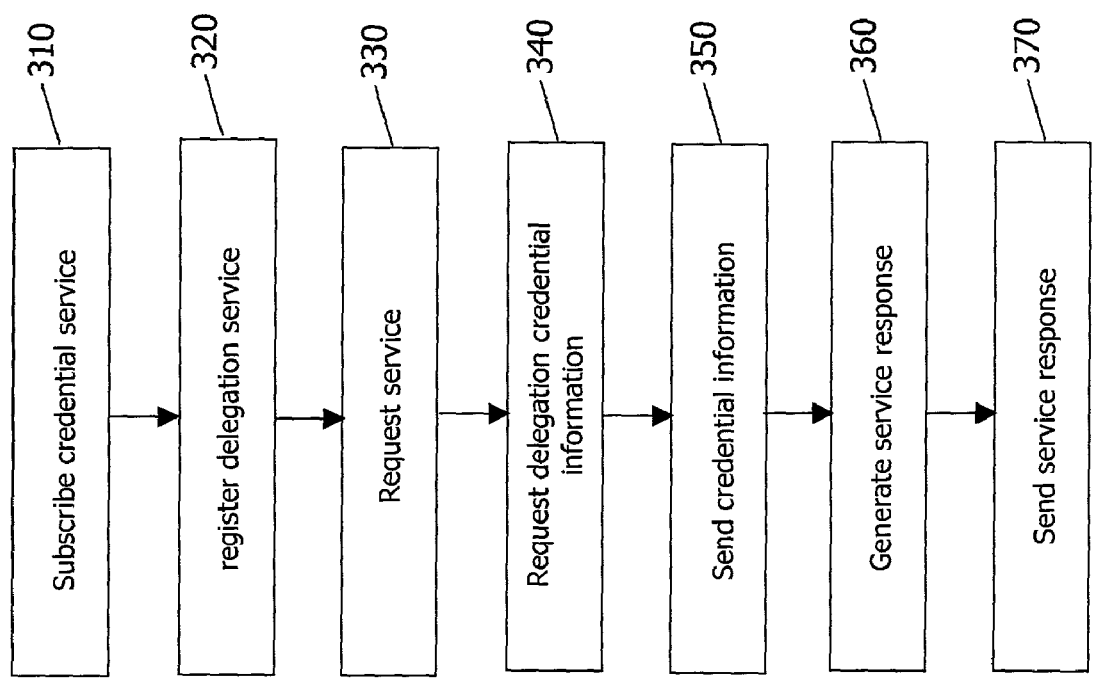
FIG. 3 is an exemplary flowchart of a process, in which a relying party provides services according to delegated credential managed by a delegation credential service provider, according to embodiments of the present invention.

FIG. 3 is an exemplary flowchart of a process, in which the framework 100 allows the relying party 230 to provide services based on delegated credential managed by the DCSP 250, according to embodiments of the present invention. A delegator and a delegate first obtain, at act 310, digital credential service from the DCSP 250. By subscribing credential service, the delegator and the delegate provide their credential information to the DCSP 250. Such information is managed in a centralized manner and may be updated and maintained in a consistent and private fashion. The DCSP may verify the credential information with outside agencies and may obtain recent status information about the credentials. When the delegator delegates his authority to the delegate, the underlying delegation relationship is registered, at act 320, with the DCSP 250. The delegator will also register the conditions under which this delegate can approve for release each piece of the delegator's credential information.

The delegate, when a need arises, requests, at act 330, a service from the relying party. The delegate signs this request and a request for the release of any necessary credential information with his private signature key. Upon receiving the service request from the delegate, the relying party 230 requests, at act 340, credential information from the DCSP 250. The DCSP 250 retrieves the requested credential information that is previously registered and stored, verifies that it is allowed to release this information, and sends, at act 350, the requested credential information back to the relying party 230. With the returned credential information, the relying party 230 authenticates the delegate based on the credential information. Based on the authentication result, the relying party 230 generates, at act 360, a service response and sends, at act 370, the response back to the delegate. In this process, the term delegate is used in a generic sense. A delegate may refer to any user. For example, a user who may be a delegator in a separate delegation relationship may independently send a service request to the relying party 230. As another example, a user without any existing delegation may also request a service from the relying party 230. The process described in FIG. 3 may be applied to all these different situations.

Figure 4:
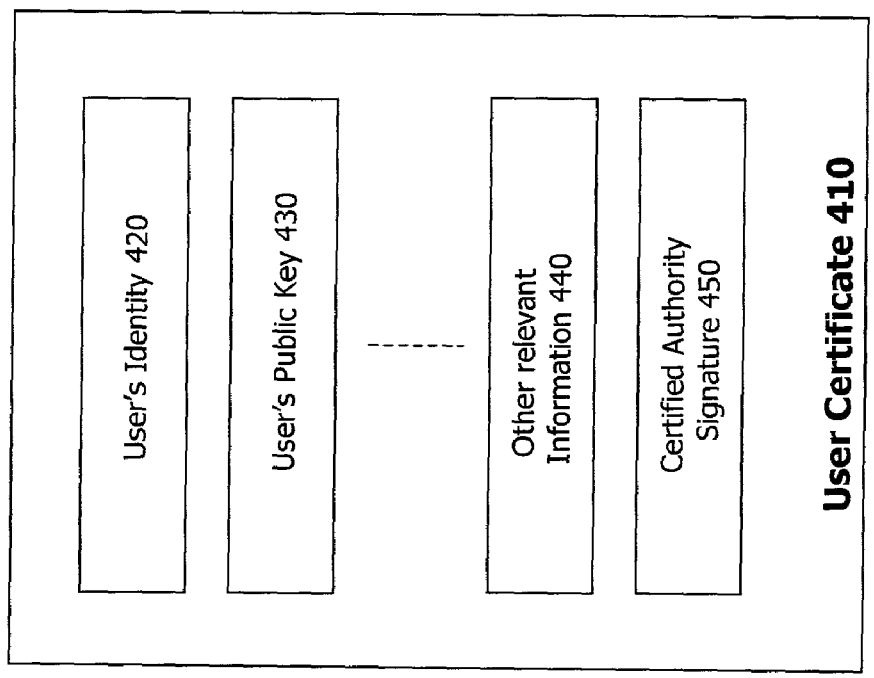
FIG. 4 illustrates an exemplary construct of a digital certificate.

FIG. 4 illustrates an exemplary construct of a digital certificate, which may be submitted by user with a service request to the relying party 230. A user's digital certificate 410 may comprise a user's identity 420, a user's public key, a certified authority signature 450, and other relevant information 440. The user's identify 420 is used to uniquely identify the user. For example, it can be a distinguished name of the user, which contains the user's name, the organization of the user, and perhaps the organizational unit of the user. A user's digital certificate 410 should not include the confidential or private information of the user. When such a digital certificate is used to authenticate a service request, the digital certificate 410 provides the information necessary for the relying party 230 to identify the user. The relying party 230 would check the digital signature of the user on the service request by verifying the digital signature using the public key in the certificate, and then verifying that the digital certificate was valid by verifying the signature of the certifying authority that issued the certificate using the public key of the certifying authority.

Figure 5:
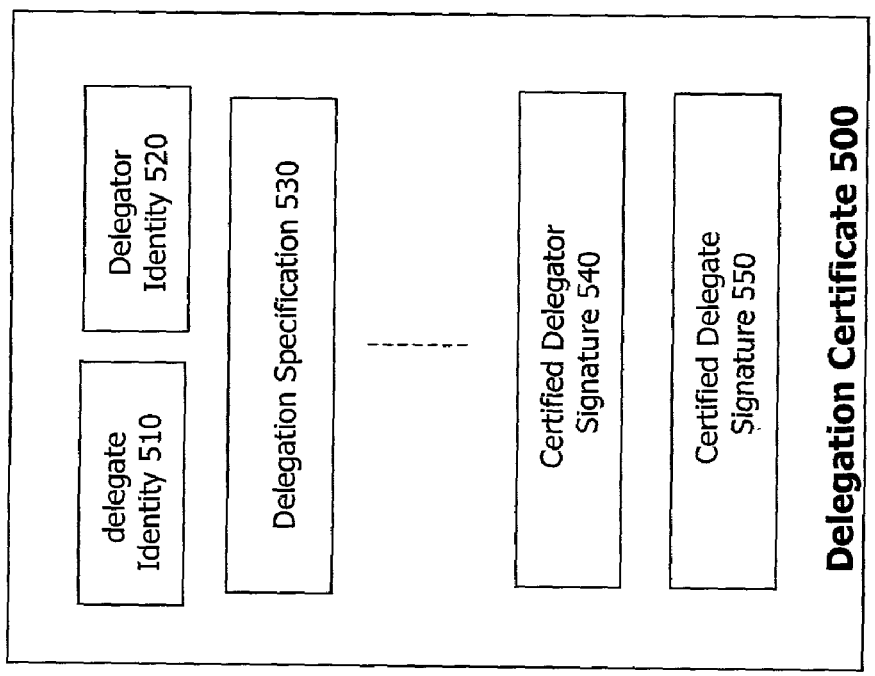
FIG. 5 illustrates an exemplary construct of a digital delegation certificate.

FIG. 5 illustrates an exemplary construct of a digital delegation certificate 500. A digital delegate certificate may be issued to a delegate when a delegation is registered with the DCSP 250. The delegate certificate 500 may comprise the identity of the delegate 510, the identity of the delegator 520, a delegation specification 530, a certified delegator signature 540, and a certified delegate signature 550. The delegate certificate 500 provides the specification about the underlying delegation such as the parties involved, the terms of the delegation, as well as the signatures from the involved parties that authorize the delegation.

Each registered delegate may be issued with a delegation digital certificate 500. A delegate may submit a delegation certificate together with a service request to the relying party 230. With a delegation certificate, the relying party 230 may verify, with the DCSP 250, the specified delegation and may subsequently request the credential information of any of the parties involved in the delegation. When a delegate has a plurality of delegations, the delegate may select an appropriate delegation that provides delegate credential that is adequate for a particular service requested. As discussed earlier, if a delegate does not indicate a delegation, the relying party 230 may either verify directly with the DCSP 250 an appropriate delegation with adequate credential or it may request the delegate to select and submit an appropriate delegation.

Figure 6:
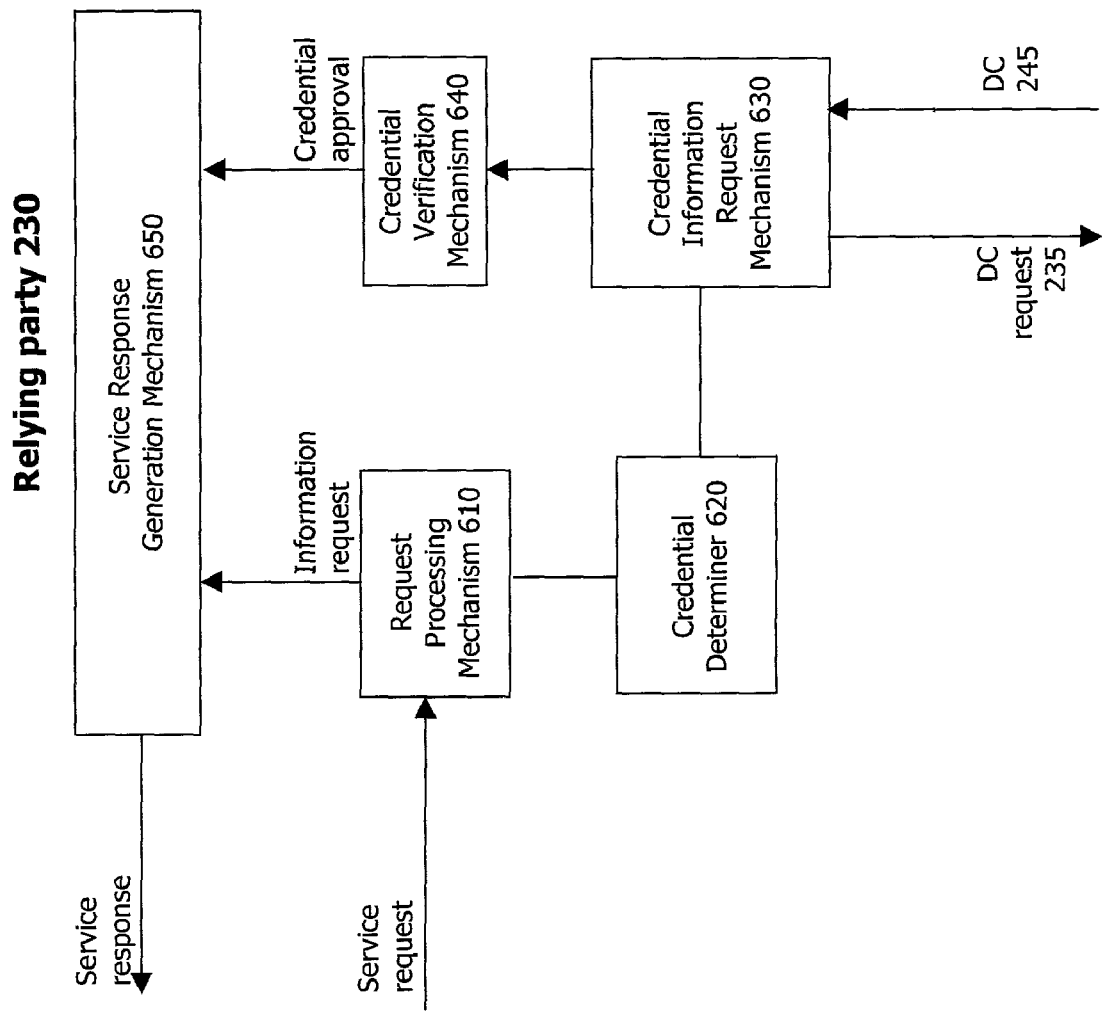
FIG. 6 depicts the internal high level functional block diagram of a relying party, according to embodiments of the present invention.

FIG. 6 depicts the internal high level functional block diagram of the relying party 230, according to embodiments of the present invention. The relying party 230 includes a request processing mechanism 610, a credential determiner 620, a credential information request mechanism 630, a credential verification mechanism 640, and a service response generation mechanism 650. The request processing mechanism 610 is responsible for processing a service request. This may include parsing a service request and classifying the type of service that is being requested. The credential determiner 620 may, based on the type of service requested, determine the credential requirements that are needed for authentication purposes. For example, if a user requests information about the usage of a particular drug, a valid medical license or delegated authority from a user with a valid medical license may be required to satisfy the authentication requirement for the service request.

The credential information request mechanism 630 is responsible for acquiring credential information. The underlying function of acquiring credential information may include constructing a delegated credential request 235, sending it to the DCSP 250, receiving the requested delegated credential 245 from the DCSP 250, and parsing such received information. To allow a user to control such information access, the credential information request mechanism 630 may also seek an approval from the user in terms of the types of credential information to be provided by the DCSP 250. This gives a user the flexibility to shield certain information from being provided by the DCSP 250.

The interaction between the credential information request mechanism 630 and a user may also include determining an appropriate delegation. For example, if the credential of a user is not adequate for authorizing the requested service, the credential information request mechanism 630 may request the user or the delegate to indicate or submit any delegation through which an adequate delegate credential may be provided for authentication. The user or the delegate may select an appropriate delegation, among possibly a plurality of available delegations, and communicate it back to the credential information request mechanism 630.

Upon receiving an approval from the user, the credential information request mechanism 630 sends a credential information request 235, constructed based on the approval, to the DCSP 250. When the credential information request mechanism 630 receives the requested credential information 245 from the DCSP 250, it may parse the information and then pass the information to the credential verification mechanism 640.

Based on the credential information 245, the credential verification mechanism 640 verifies that the delegated credential is valid and that it satisfies the authentication requirement. The service response generation mechanism 650 then constructs the service response 255 according to the verification results.

Figure 7:
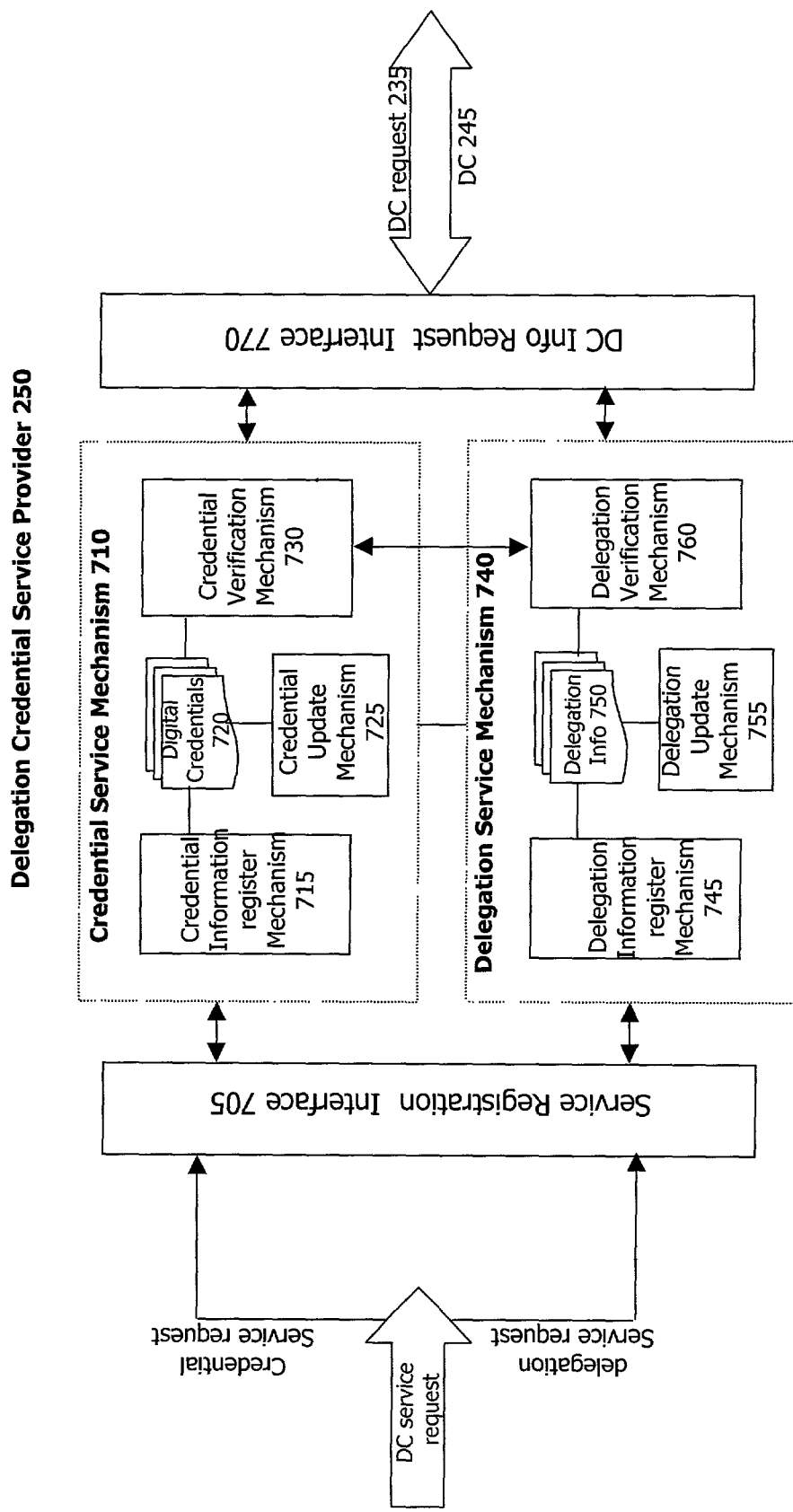
FIG. 7 depicts the internal high level functional block diagram of a delegation credential service provider, according to embodiments of the present invention.

FIG. 7 depicts the internal high level functional block diagram of the DCSP 250, according to embodiments of the present invention. The DCSP 250 interfaces with both delegates 210a, . . . , 220b and delegators 210a, . . . , 220a, as well as the relying party 230 (see FIG. 2). The DCSP 250 comprises a service registration interface 705 that interfaces with users (delegates and delegators) for service subscription and registration purposes, a delegate credential (DC) information request interface 770 that interfaces with the relying party 230, a credential service mechanism 710 that manages digital credentials of subscribers, and a delegation service mechanism 740 that manages delegation relationships.

The service registration interface 705 intercepts a service request 215 (requesting either a delegation or a credential service) and facilitates a user to sign up a desired service. It parses a user's service request and determines whether it is a credential service request or a delegation service request. If it is a credential service request, the service registration interface 705 invokes the credential service mechanism 710. A user that requests a credential service may provide the user's credential information either along with the service request or through an interactive process. Such gathered credential information is forwarded from the service registration interface 705 to the credential service mechanism 710, which subsequently registers the user for the credential service and records the user's credential information.

If the service requested is for registering a delegation, the service registration interface 705 invokes the delegation service mechanism 740. A user who requests a delegation service may provide information relevant to the delegation such as the identities of the delegator and the delegate. Both the delegator and the delegate may be required to subscribe to the credential service of the DCSP 250. In this case, their credential information is already registered and recorded in the credential service mechanism 710.

Delegate relevant information may be provided to the service registration interface 705 with the service request or through an interactive process. Such gathered delegation information is forwarded from the service registration interface 705 to the delegation service mechanism 740, which subsequently registers the delegation relevant information and reference to the credential information of each party (the delegator and the delegate) recorded in the credential service mechanism 710.

The credential service mechanism 710 supports digital credential services. It registers users' credential information, maintains such credential information, retrieves it when so requested, and updates it when such need arises. The credential service mechanism 710 comprises a credential information register mechanism 715, a digital credential storage 720, a credential verification mechanism 730, and a credential update mechanism 725. The credential information register mechanism 715 is responsible for recording service subscriber's credential information and store such information in the digital credential storage 720. Proper index may be established based on subscriber's unique identity information for efficient retrieval purposes. The credential verification mechanism 730 is responsible for proper retrieval and verification of the credential information.

The credential information stored in the digital credential storage 720 may be updated upon requests from different sources. For example, a physician, as a subscriber of the credential service, may have acquired another medical license from a different state. As another example, a sanction may have been recently imposed on the physician. In this case, the party who requests an update may be the Drug Enforcement Agency (DEA). Changes may replace the previously stored information or they may be incorporated as part of the subscriber's credential so that a history of updates is also stored. The credential update mechanism 725 is responsible for updating the digital credential storage 720.

The delegation service mechanism 740, together with the credential service mechanism 710, supports delegation credential services. Particularly, the delegation service mechanism 740 registers users' delegation relationships and the relevant delegation information, maintains such information, verifies delegation relationships when so requested, and updates existing delegation relationships when needed. The delegation service mechanism 740 comprises a delegation information register mechanism 745, a delegation information storage 750, a delegation verification mechanism 760, and a delegation update mechanism 755.

The delegation information register mechanism 745 is responsible for recording registered delegation relationships and the relevant information and store such information in the delegation information storage 750. Cross-references between the delegation information storage 750 and the credential information storage 720 may be established. For example, from a particular delegation relationship (stored in the delegation storage 750) involving a delegator and a delegate, the corresponding credential information of the delegator and the delegate can be effectively retrieved based on the cross-reference index between the delegation information storage 750 and the digital credential storage 720.

In the DCSP 250, both the credential service mechanism 710 and the delegation service mechanism 740 may be capable of independently providing services to users. At the same time, together they effectively facilitate the delegate credential services. For example, from a particular delegation relationship, the DCSP 250 can easily retrieve the delegator's credential. In addition, given a delegate's identity, the DCSP 250 can effectively verify whether there exists a delegation relationship, under the delegate's identity, which satisfies the credential requirements of the authentication.

The delegation verification mechanism 760 is responsible for verifying registered delegation relationships. As discussed earlier, the relying party 230 may request, based on an appropriate delegation relationship specified or selected by the user, the DCSP 250 to verify whether the given delegation relationship exists. On the other hand, the relying party 230 may also depend on the DCSP 250 to identify an existing delegation under a certain user, which may provide a credential that satisfies a particular authentication requirement. In this case, the delegation verification mechanism 760 may search the available delegations under the given user's identity in the delegation information storage 750 and then may cross reference the credential information stored in the digital credential storage 720 to identify such required credential.

The delegation information stored in the delegation information storage 750 may be updated upon a request. Such a request may be made by, for example, a delegator. A requested change to an existing delegation relationship may be updating the terms of the delegation or revoking the delegation. A delegate may also request a change. For instance, a delegate may be temporarily not available and wish to re-delegate to a third party. Such changes may be made so that a revised delegation takes effect either immediately or at a specified point of time. The delegation update mechanism 755 is responsible for updating the delegation information storage 750.

Figure 8:
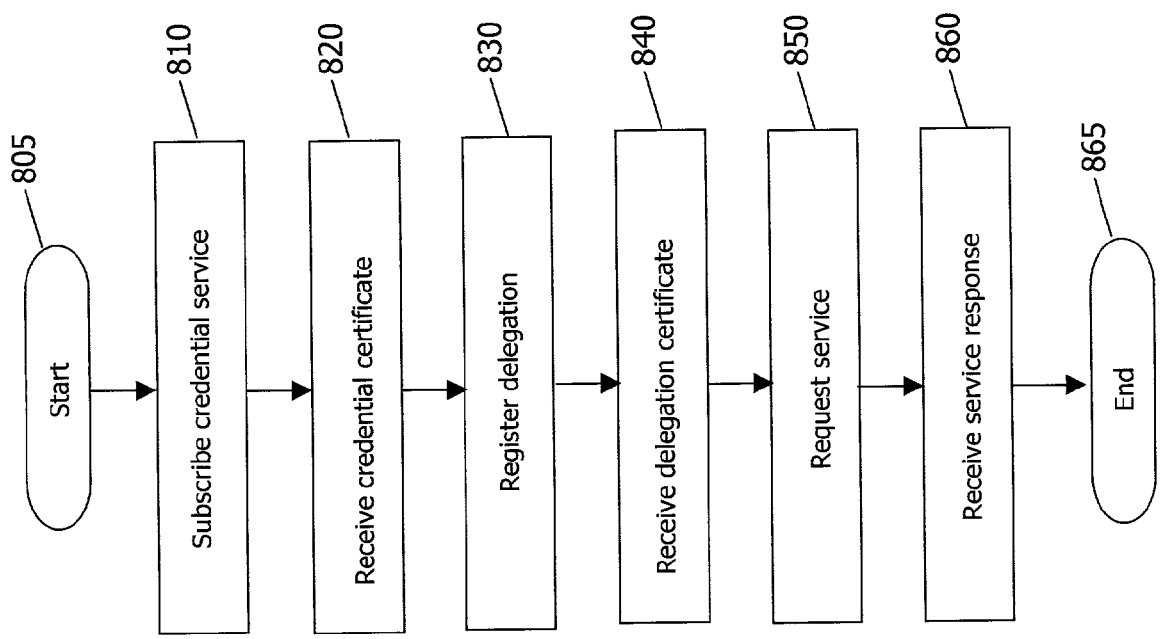
FIG. 8 is an exemplary flowchart of a process, in which a delegate registers a delegation with a delegation credential service provider and obtains a service from a relying party, according to embodiments of the present invention.

FIG. 8 is an exemplary flowchart of a process, in which a delegate registers a delegation with the delegation credential service provider and requests a service from the relying party 230, according to embodiments of the present invention. The delegate first subscribes, at act 810, a credential service from the DCSP 250. A digital certificate may be issued and received at act 820. The delegate then registers, at act 830, a delegation with the DCSP 250 and receives, at act 840, a delegation certificate. The delegate, when needed, requests, at act 850, a service from the relying party 230. The delegate may send, with a service request, the received digital certificate or possibly also with the delegation certificate. A service response is received, at act 860, from the relying party 230.

Figure 9:
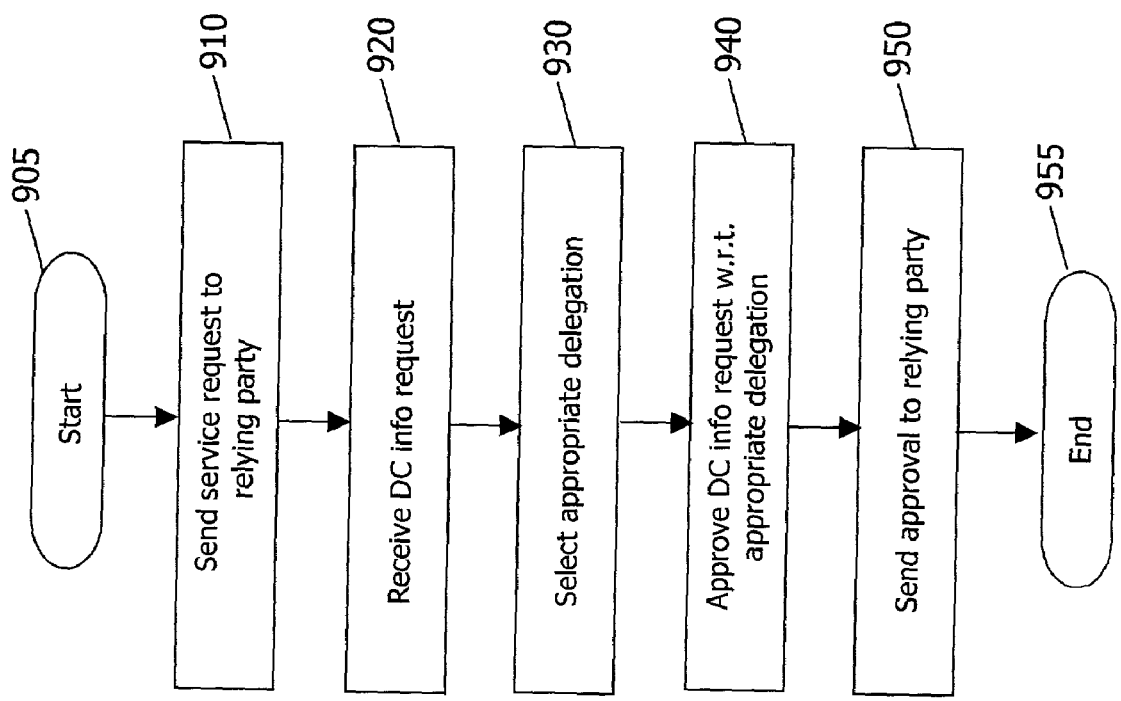
FIG. 9 is an exemplary flowchart of a process, in which a delegate interacts with the relying party to complete a service request, according to embodiments of the present invention.

Before the relying party 230 sends back a service response, there may be more interaction between the relying party and the delegate. For example, the relying party 230 may send a credential information request to the delegate for approval. The relying party 230 may also request the delegate to select an appropriate delegation, if the delegate does not send such delegation information with the service request to the relying party. FIG. 9 is an exemplary flowchart of a process, in which a delegate interacts with the relying party to complete the process of a service request, according to embodiments of the present invention.

A delegate first sends, at act 910, a service request to the relying party 230. The relying party 230 then constructs a credential information request and, if necessary, sends such a request to the delegate for approval. The credential information request is first sent to the delegate so that the delegate has control over what can be inquired by the relying party 230 from the DCSP 250. Upon receiving the credential information request at act 920, the delegate selects, at act 930, an appropriate delegation and approves, at act 940, the credential information request. The approval may be specified with respect to the selected delegation. The delegate then sends, at act 950, its approval to the relying party 230 to complete the service request process.

Figure 10:
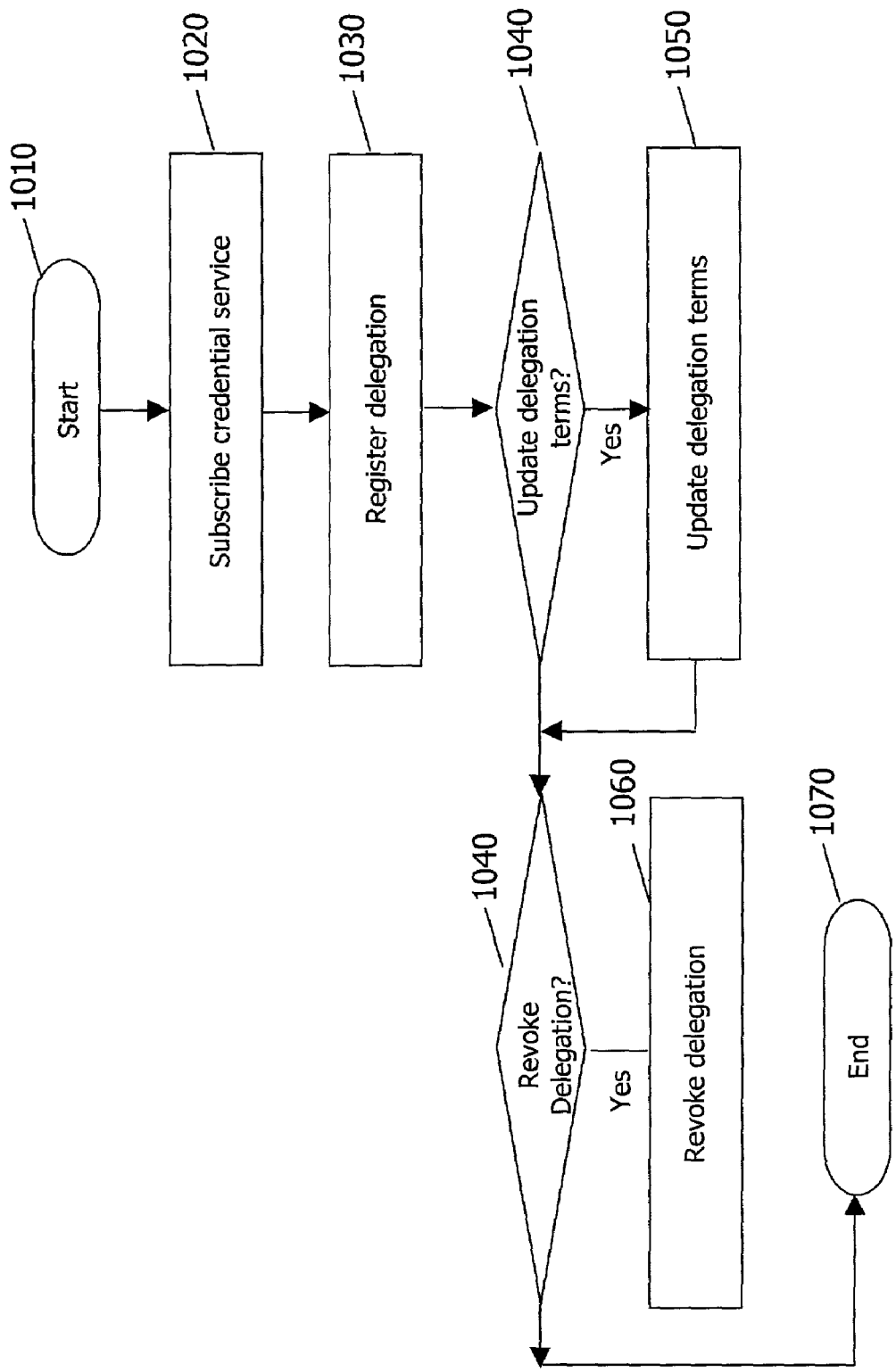
FIG. 10 is an exemplary flowchart of a process, in which a delegator registers a delegation with a delegation credential service provider, according to an embodiment of the present invention.

FIG. 10 is an exemplary flowchart of a process, in which a delegator registers a delegation with the DCSP 250, according to an embodiment of the present invention. The delegator first subscribes, at act 1020, credential service from the DCSP 250 before registering, at act 1030, a delegation in which the delegator delegates certain authority to a specified delegate. Once such a delegation is registered, the delegator can change it at any time. If the delegator desires to change the terms of the delegation, determined at act 1040, the new delegation terms are provided, based on which the existing terms are updated at act 1050. If the delegator desires to revoke the delegation, determined at act 1060, the delegation is revoked at act 1070. In this case, even though the underlying delegate may still hold the delegation certificate (issued when the delegation is initially registered), the delegation is void or invalid according to the updated record that is dynamically maintained by the DCSP 250. With such updated record, when the relying party 230 attempts to verify the delegation with the DCSP 250, the verification will indicates that the delegation is no longer valid.

Figure 11:
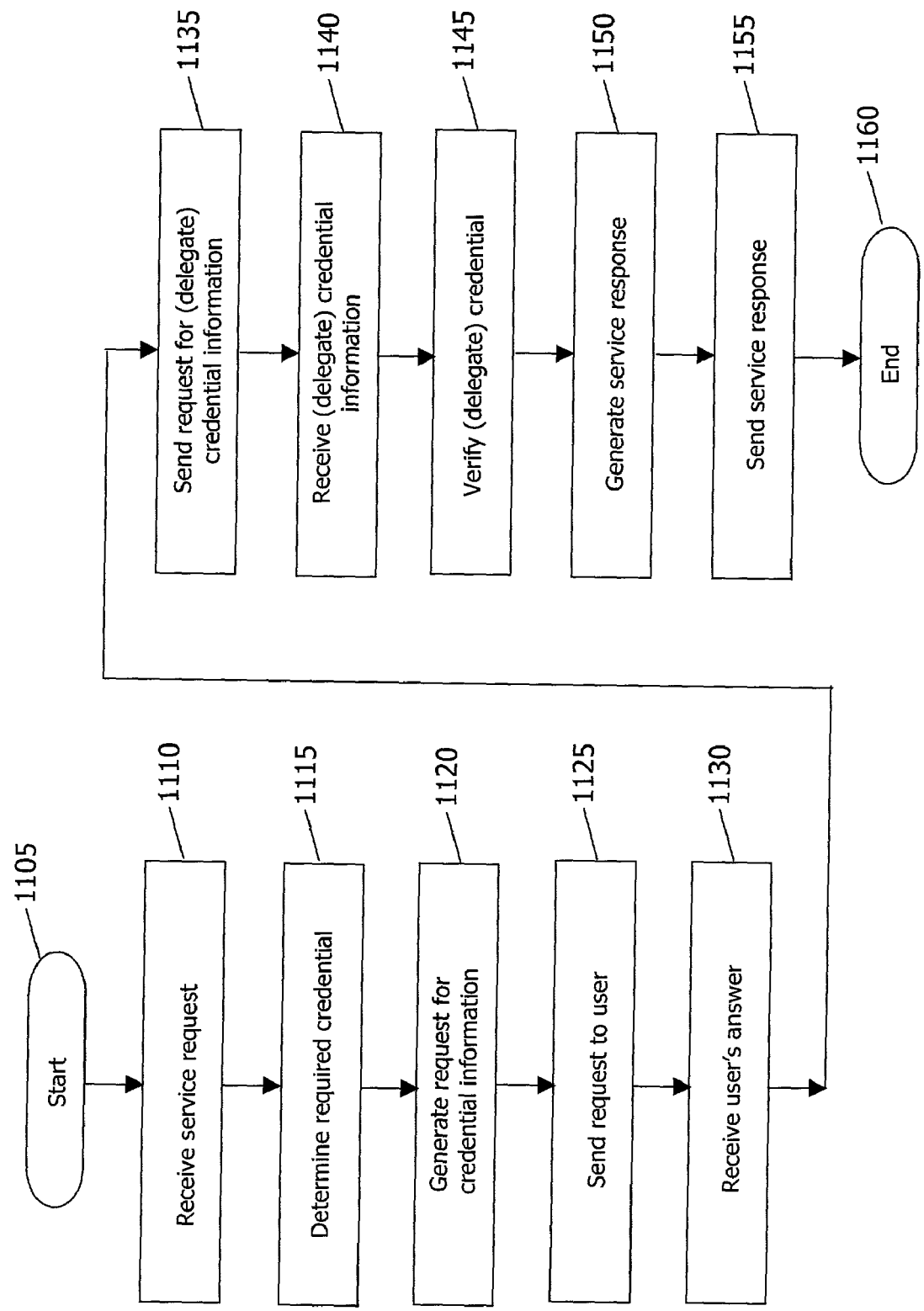
FIG. 11 is an exemplary flowchart of a process, in which a relying party provides service to a delegate based on delegated credential, according to embodiments of the present invention.

FIG. 11 is an exemplary flowchart of a process, in which the relying party 230 provides a service to a delegate based on delegated credential, according to embodiments of the present invention. A service request is first received at act 1110 from a delegate. Based on the received service request, the relying party 230 may determine, at act 1115, the credential required for authenticating the requested service and generates accordingly, at act 1120, a delegated credential request. The required credential may be either the credential information of the delegate or that of a delegator under an appropriate delegation. To obtain any required credential information approval, the relying party 230 sends, at act 1125, the delegated credential request to the delegate for approval.

Upon receiving the approval from the delegate at act 1130, the relying party 230 sends, at act 1135, the approved credential information request to the DCSP 250. The received approval may indicate an appropriate delegation that may meet the credential requirements for the request.

The relying party 230 receives, at act 1140, the requested credential information from the DCSP 250. The DCSP 250 may return both the requested credential information (of either the delegate or the delegator or both) and the verification of an appropriate delegation that gives rise to the required credential information. Upon receiving the credential information, the relying party 230 verifies (authenticates), at act 1145, the credential with respect to the requested service. Based on the verification result, the relying party 230 generates, at act 1150, a service response, which may correspond to the service requested, if, for example, the authentication is successful, or a refusal of the requested service, if the authentication is not successful. The service response is then sent, at act 1155, to the delegate who made the service request.

Figure 12:
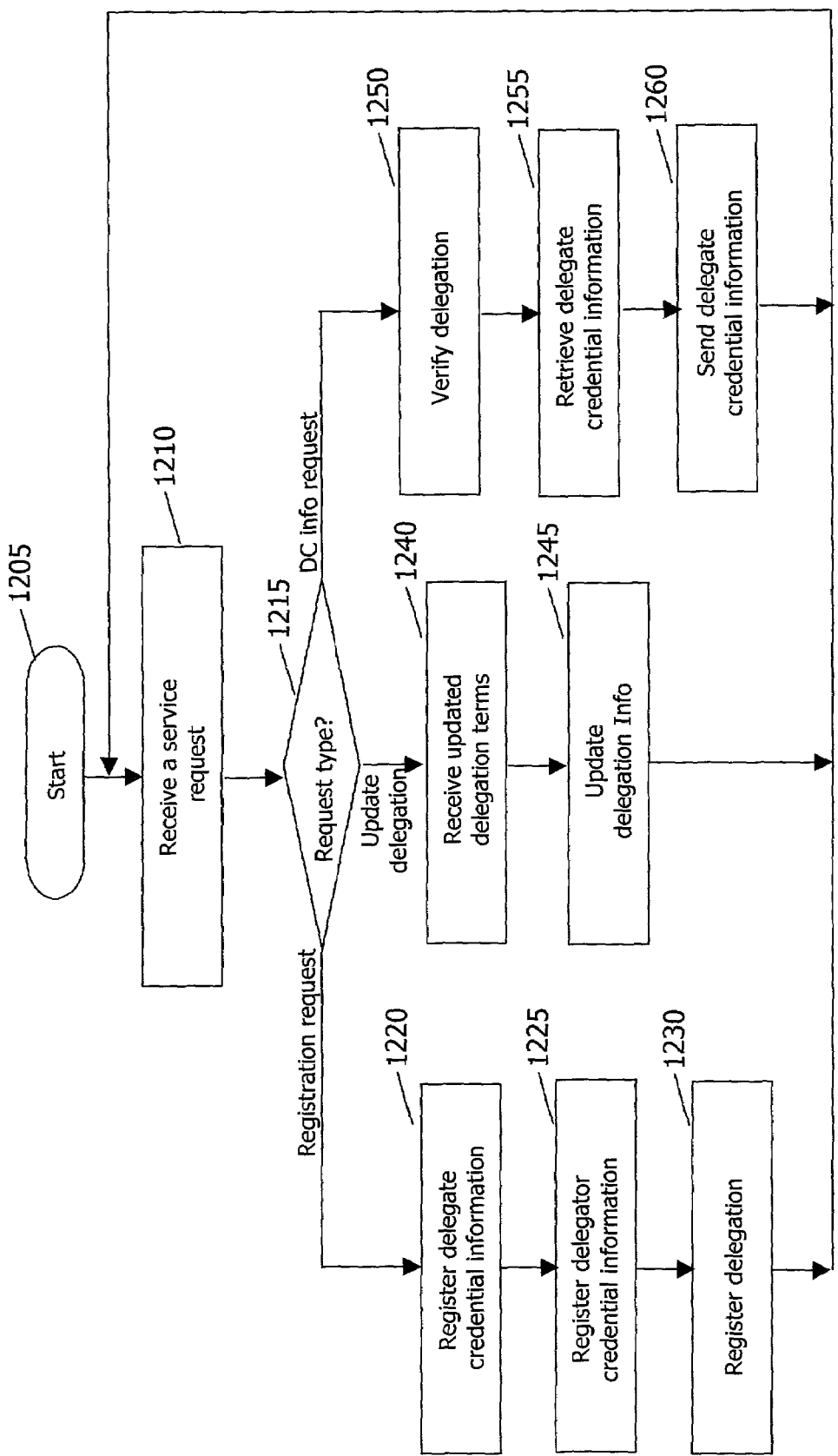
FIG. 12 is an exemplary flowchart of a process, in which a delegation credential service provider manages and verifies digital credentials of delegation parties, according to embodiments of the present invention.

FIG. 12 is an exemplary flowchart of a process, in which the DCSP 250 manages and verifies delegation credentials of delegation parties, according to embodiments of the present invention. A service request is first received at act 1210. The nature of the service request is determined at act 1215. In the exemplary embodiment illustrated in FIG. 12, three types of service requests are described. There may be other types of service requests and may be accordingly handled by the DCSP 250.

If a service request is from a subscriber or subscribers for registering a service (e.g., either registering a digital credential service or a delegation service or both), the DCSP 250 registers the subscriber(s) for the desired service. The credential information of a delegate is registered at act 1220. The credential information of a delegator is registered at act 1225. When a delegate and a delegator forms a delegation relationship, the delegation relationship, including its terms, is registered at act 1230.

If a service request is a delegated credential request from the relying party 230 for digital credential information of a delegate or a delegator or both, the DCSP 250 first verifies, at act 1250, the underlying delegation relationship. The verification may include verifying an appropriate delegation indicated in the delegated credential request. It may also verify an appropriate delegation based on required credential specified in the delegated credential request. In this case, the DCSP 250 may identify an appropriate delegation between the delegate who makes the service request and an appropriate delegator that provides the required credential. Based on the appropriate delegation, the DCSP 250 retrieves, at act 1255, the requested credential information and sends, at act 1260, the retrieved information to the relying party 230.

If a service request is for updating an existing delegation, the DCSP 250 receives, at act 1240, the updated delegation terms. Based on the updated delegation terms, the underlying delegation is updated, at act 1245, according to the new terms. An update request may be from either a delegate or a delegator. The new terms of an existing delegation may correspond to updated credentials or revocation of the delegation.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather can be embodied in a wide variety of forms, some of which may be quite different from those of the disclosed embodiments and extends to all equivalent structures, acts, and, materials, such as are within the scope of the appended claims.

What is claimed is:

1. A method for controlling access to credential information, the method comprising:
   requesting, by a delegate with a delegation from a delegator, a service from a relying party;
   determining a credential requirement based on a type of the service requested;
   requesting, by the relying party based on the determined credential requirement and the delegation, credential information from a delegate credential service provider;
   sending, by the delegate credential service provider, the credential information to the relying party;
   generating, by the relying party, a service response according to the credential information received from the delegate credential service provider; and sending the service response to the delegate.

2. The method according to claim 1, wherein said credential information contains credential information for the delegator.

3. The method according to claim 2, wherein said requesting delegated credential includes:
   generating a credential information request based on the service requested and the delegation;
   sending the credential information request to the delegate for an approval that authorizes the credential information request;
   receiving the approval from the delegate; and sending the approved delegated credential request to the delegate credential service provider.

4. The method according to claim 3, wherein: sending the credential information request to the delegate includes sending a request for information related to an appropriate delegation; and
   receiving the approval from the delegate includes receiving the information related to an appropriate delegation.

5. The method according to claim 1, wherein said sending the credential information includes:
   verifying the delegation registered by the delegate and delegator;
   retrieving credential information associated with the delegation; and
   forwarding the retrieved credential information to the relying party.

6. The method according to claim 1, further including: subscribing, by the delegate and the delegator, a digital credential service from a credential service provider.

7. The method according to claim 5, further including registering, by the delegator, the conditions under which pieces of the credential information can be released to relying parties.

8. A method for verifying credential information by a relying party, the method comprising:
   receiving, from a delegate, a request for a service;
   determining a credential requirement based on a type of the service requested:
   sending a credential information request based on the determined credential requirement to a delegate credential service provider;
   receiving requested credential information from the delegate credential service provider;
   verifying the credential information;

generating a service response based on the results from the verifying and the request for the service; and
sending the service response to the delegate.

9. The method according to claim 8, wherein said sending the credential information request includes:
    sending the credential information request to the delegate to obtain an approval; receiving the approval from the delegate; and sending the credential information request to the delegate credential service provider.

10. The method according to claim 8, further including:
    determining, using the credential required, an appropriate delegation.

11. The method according to claim 10, wherein said determining the appropriate delegation includes one of:
    obtaining the appropriate delegation specified in the request for service sent by the delegate;
    selecting the appropriate delegation by the delegate upon receiving the credential information request; or
    verifying the appropriate delegation by the delegate credential service provider.

12. A method for controlling access to credential information by a delegate credential service provider, the method comprising:
    receiving a service request;
    determining the service type based on the service request;
    determining a credential requirement based on the service type of the service request;
    registering, if the service type is for subscribing a digital credential service, a user's credential information for requested digital credential service based on the determined credential requirement;
    registering, if the service type is for delegation service, a delegation between a delegator and a delegate, the delegation including delegation terms;
    changing, if the service type is for updating an existing delegation, the terms of an existing delegation; and
    providing, if the service request is a credential information request from a relying party for credential information required for a service requested by a delegate, credential information.

13. The method according to claim 12, wherein said changing the terms of a delegation includes:
    receiving, from a user, revised delegation terms; and updating the terms of the existing delegation using the revised delegation terms.

14. The method according to claim 12, wherein said providing delegated credential includes:
    retrieving the requested delegated credential; and
    sending the retrieved delegated credential to the relying party.

15. The method according to claim 12, further comprising: registering by the delegator the conditions under which a portion of the credential information can be released to relying parties; and
    determining, prior to the retrieving, a delegation, between the delegate, who requests the service from the relying party, and a delegator, wherein the digital credential information of the delegator corresponds to the delegated credential required for the service requested by the delegate.

16. A system for verifying credential information by a relying party, comprising:
    a service request processing mechanism for processing a service request for a service from a user;
    a credential determiner for determining, prior to obtaining credential information, a credential requirement based on a type of the service requested by the user;
    a credential information request mechanism for obtaining credential information based on the determined credential requirement from a delegation credential service provider; and
    a service response generation mechanism for generating a service response based on the service request and the required credential information.

17. The system according to claim 16, further including:
    a credential verification mechanism for verifying the required credential information obtained from the delegation credential service provider before the service response is generated.

18. A machine-accessible medium having encoded thereon, program code for verifying credential information by a relying party, the program code including instructions which when executed cause:
    receiving, from a delegate, a request for a service; determining a credential requirement based on a type of the service requested;
    sending a credential information request to a delegate credential service provider based on the determined credential requirement;
    receiving the requested credential information from the delegate credential service provider;
    verifying the credential information;
    generating a service response based on the results from the verifying and the request for the service; and
    sending the service response to the delegate.

19. The medium according to claim 18, wherein said sending the credential information request includes:
    sending the credential information request to the delegate to obtain an approval;
    receiving the approval from the delegate; and
    sending the credential information request to the delegate credential service provider.

20. The medium according to claim 19, including program code having instructions which when executed, further cause:
    determining, using the determined credential requirement, an appropriate delegation based on which the credential information request is constructed.

21. The medium according to claim 20, wherein the determining the appropriate delegation includes one of:
    obtaining the appropriate delegation specified in the request for service sent by the delegate;
    selecting the appropriate delegation by the delegate upon receiving the credential information request for approval; or verifying the appropriate delegation by the delegate credential service provider.

22. A machine-accessible medium having encoded thereon, program code for controlling access to credential information by a delegate credential service provider, the program code including instructions which when executed cause;
    receiving a service request;
    determining the service type based on the service request;
    determining a credential requirement based on the service type of the received service request;
    registering, if the service type is for subscribing a digital credential service, a user's credential information based on the determined credential requirement for requested digital credential service;
    registering, if the service type is for delegation service, a delegation between a delegator and a delegate, the delegation including delegation terms;

changing, if the service type is for updating an existing delegation, the terms of an existing delegation; and providing, if the service request is a credential information request from a relying party for digital credential information required for a service requested by a delegate, required credential information.

23. The medium according to claim 22, wherein said updating a delegation includes:

receiving, from a user, revised delegation terms; and
updating the terms of the existing delegation using the revised delegation terms.

24. The medium according to claim 22, wherein said providing delegate credential information includes:

retrieving the required delegated credential; and sending the retrieved credential information to the relying party.

25. The medium according to claim 24, including program code having instructions which when executed, further cause:

determining, prior to the retrieving, a delegation between the delegate, who requests the service from the relying party, and a delegator, wherein the digital credential information of the delegator corresponds to the credential information required for the service requested by the delegate.

* * * * *